(12) United States Patent
Bigham

(10) Patent No.: US 8,544,802 B2
(45) Date of Patent: Oct. 1, 2013

(54) CABLE SUPPORT CLIP

(76) Inventor: Paul Bigham, Healdsburg, CA (US)

( * ) Notice: Subject to any disclaimer, the term of this patent is extended or adjusted under 35 U.S.C. 154(b) by 177 days.

(21) Appl. No.: 12/785,714

(22) Filed: May 24, 2010

(65) Prior Publication Data

US 2010/0326008 A1 Dec. 30, 2010

Related U.S. Application Data

(60) Provisional application No. 61/222,040, filed on Jun. 30, 2009.

(51) Int. Cl.
*F16L 3/00* (2006.01)

(52) U.S. Cl.
USPC ............. 248/49; 248/58; 248/65; 248/68.1; 248/74.2; 248/303; 174/68.1; 174/48

(58) Field of Classification Search
USPC .............. 248/249, 49, 58, 65, 302, 303, 339, 248/588, 68.1, 74.2, 317, 309.1, 175, 682, 248/690; 174/68.1, 68.3, 48, 50.6; 211/106, 211/85.31, 112, 119, 126.9; 24/455
See application file for complete search history.

(56) References Cited

U.S. PATENT DOCUMENTS

| | | | |
|---|---|---|---|
| 4,238,098 A | 12/1980 | Siegfried et al. | |
| 4,768,741 A | 9/1988 | Logsdon | |
| 5,100,008 A * | 3/1992 | O'Herron | 211/106 |
| 5,531,410 A * | 7/1996 | Simon | 248/49 |
| 5,657,953 A * | 8/1997 | Smith | 248/217.1 |
| 5,845,882 A | 12/1998 | Hodges et al. | |
| 6,152,412 A | 11/2000 | Basickes et al. | |
| 6,637,704 B2 * | 10/2003 | Jette | 248/49 |
| 6,855,884 B2 * | 2/2005 | Spagnoli et al. | 174/507 |
| 6,926,236 B2 * | 8/2005 | Jette | 248/68.1 |
| 7,137,608 B2 * | 11/2006 | Willey | 248/519 |
| 7,304,240 B1 * | 12/2007 | Gretz | 174/72 A |
| 7,364,130 B2 * | 4/2008 | Lai | 248/519 |
| 7,497,405 B2 * | 3/2009 | Huo | 248/68.1 |
| 2010/0326008 A1 | 12/2010 | Bigham | |
| 2011/0309042 A1 * | 12/2011 | Finck | 211/41.14 |

* cited by examiner

*Primary Examiner* — Todd M. Epps
(74) *Attorney, Agent, or Firm* — Bay Area Technology Law Group PC

(57) ABSTRACT

A device for securing cable to a structural support, such as a rafter or joist. The device is characterized as having two U-shaped members, each U-shaped member having a base portion and two arm portions. Each arm portion has a proximal end and a distal end, each proximal end extending from said base portion. The distal ends are spaced from one another a distance to capture the structural support and to frictionally secure the device thereto.

7 Claims, 2 Drawing Sheets

CABLE SUPPORT CLIP

RELATED APPLICATIONS

This application relies on provisional application Ser. No. 61/222,040 filed on Jun. 30, 2009.

TECHNICAL FIELD

The present invention relates generally to tools and hardware, and more particularly to an improved support clip apparatus that can be used to suspend cable, conduit, pipes, wires, and the like beneath a floor joist or other structural or non-structural member.

BACKGROUND OF THE INVENTION

Residential and commercial construction often requires the installation of cables, pipes, conduit, wires, or other construction material beneath a floor or other surface, such as during the installation of air conditioning and heating equipment. Such installation typically involves the suspending of the cable, conduit or pipe from a floor joist, beam, or other structural flame member, utilizing segments of metal or plastic strap material that are nailed or otherwise secured to the joist This practice is awkward, labor-intensive, and time-consuming, especially in the cramped and dark confines of a crawl space beneath a floor.

Some hardware devices have been proposed to address this problem. For example, U.S. Pat. No. 4,238,098 to Siegfried, et al., discloses a spring-action suspensory device for attachment to overhead beams. The generally U-shaped spring-action device attaches to overhead beams for the purpose of forming an anchor to which suspensory rods may be attached for suspending ceilings, pipes, ducts or other structures.

U.S. Pat. No. 4,768,741 to Logsdon describes a pipe hanger constructed so as to utilize a central body portion and a separate strap Both ends of the body portion includes a vertically extending slot. A ratchet structure is provided in one of the body portion slots. The strap is provided with an enlarged head at one of its ends so that it can be dropped through the other of the slots until it is held against further movement by the head engaging the body portion. Ratchet teeth are located on the other end of the strap so that the strap can be wrapped around a pipe and the pipe seemed to the body portion by inserting the other end of the strap in the slot having the ratchet structure in the body portion.

U.S. Pat. No. 5,845,882 to Hodges, et al. teaches a pipe hanger for suspending a pipe from a support structure at a variety of angles and includes a stem and a flexible hook attached to the stem The stem has at least one groove suitable for accepting a staple for hanging the pipe hanger from the support structure. The grooves may be polygonal, allowing the pipe hanger to be suspended at a variety of angles. The hook has a curved portion to accept a pipe in a snap-fit position. The stem may be shortened to a suitable length by severing the stem at any one of the grooves U.S. Pat. No. 6,152,412 to Basickes et al., discloses a pipe hanger which has a tubular section which is split axially so that the tubular section can be opened and fit around a pipe. Two partially overlapping tabs extend from the tubular section. When the tabs are urged together, holes in the tabs become aligned, and permit a single fastener to secure the tabs together, and to affix the hanger to a support structure. The hanger therefore requires only a single fastener. The fastener is preferably supplied with the hanger, and is held by friction in one of the holes in the tabs, or in a tubular chamber extending from one of the tabs. The shape of the tubular section facilitates manual closing of the tubular section around the pipe. The hanger is very easy to install, even when the hanger is located in an inconvenient position.

United States Patent Application 20080203247 by Hill describes a device for securing a conduit to a structural object. The device includes a clip having a longitudinally extending clip body with a conduit receiving cavity extending in the longitudinally direction and about a cavity axis with a longitudinally extending conduit receiving slot. The device further including a panel strap securable to the structural object.

The foregoing patents and patent application reflect the current state of the art of which the present inventor is aware. Reference to, and discussion of, these patents and patent application is intended to aid in discharging applicant's acknowledged duty of candor in disclosing information that may be relevant to the examination of claims to the present invention. However, it is respectfully submitted that none of the above-indicated patents or patent application disclose, teach, suggest, show, or otherwise render obvious, either singly or when considered in combination, the invention described and claimed herein.

SUMMARY OF THE INVENTION

A device for securing cable to a structural support, such as a rafter or joist. The device is characterized as having two U-shaped members, each U-shaped member having a base portion and two aim portions. Each arm portion has a proximal end and a distal end, each proximal end extending from said base portion. The distal ends are spaced from one another a distance to capture the structural support and to frictionally secure the device thereto.

DETAILED DESCRIPTION OF THE INVENTION

Figure 1:
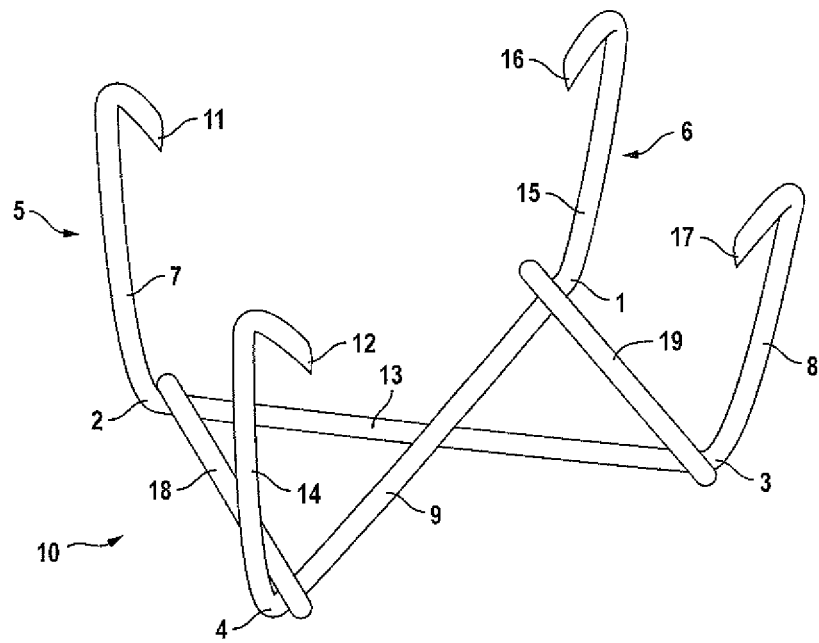
FIG. 1 is a perspective view of the first embodiment of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto.

Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 3:
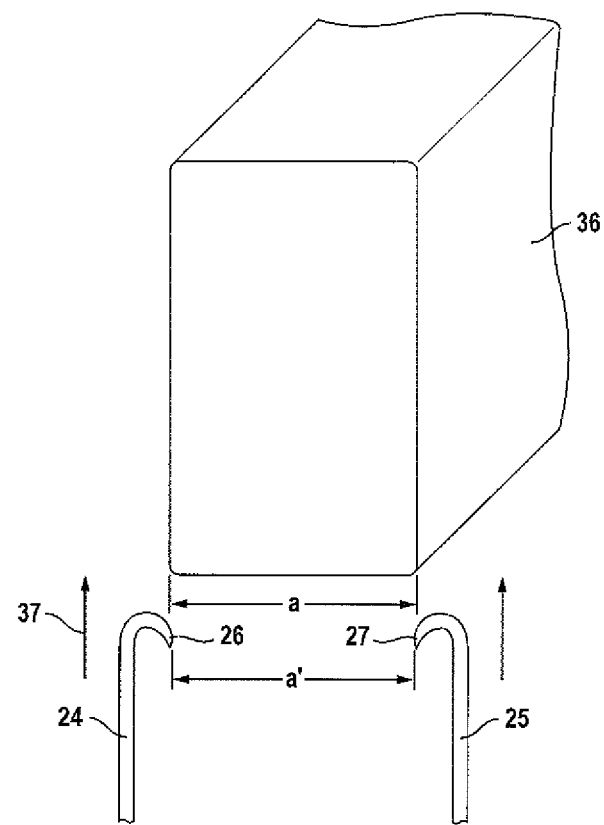
FIG. 3 is a perspective view of a rafter or joist and a portion of the present invention shown engaging it in carrying out the present method.
Figure 4:
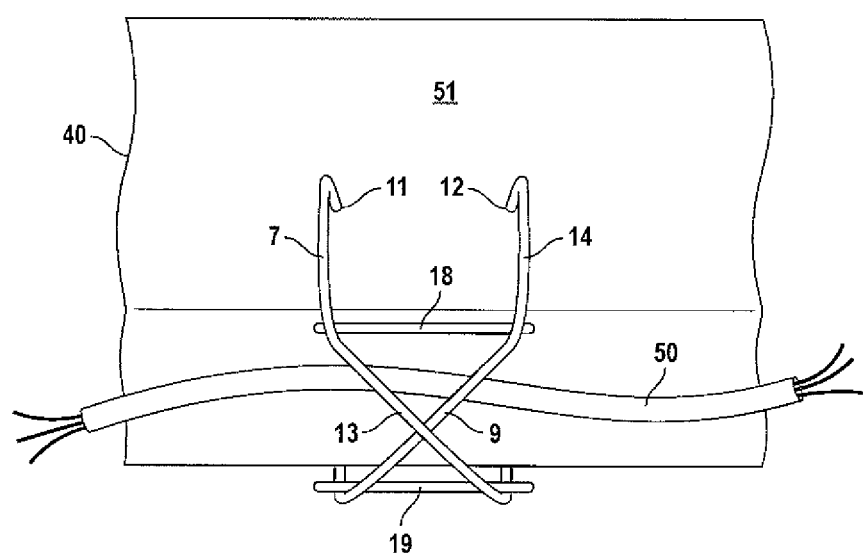
FIG. 4 is a perspective view of a rafter or a joist together with the present invention again showing how this invention operates in carrying out the present method.

Turning first to FIG. 1, device 10 is depicted for securing cable to a structural support, such as rafter or joist 36 (FIG. 3 or 40 (FIG. 4). Device 10 is composed of U-shaped members 5 and 6, each U-shaped member having base portions 13 and 9, respectively, and two arm portions 7, 8 and 14, 15, respectively. Each arm portion has a proximal end 2/3 and 4/1, respectively extending from base portions 9 and 13 and distal ends ideally terminating in hook segments 11, 17 and 12, 16 extending inwardly and towards one another as shown.

Figure 2:
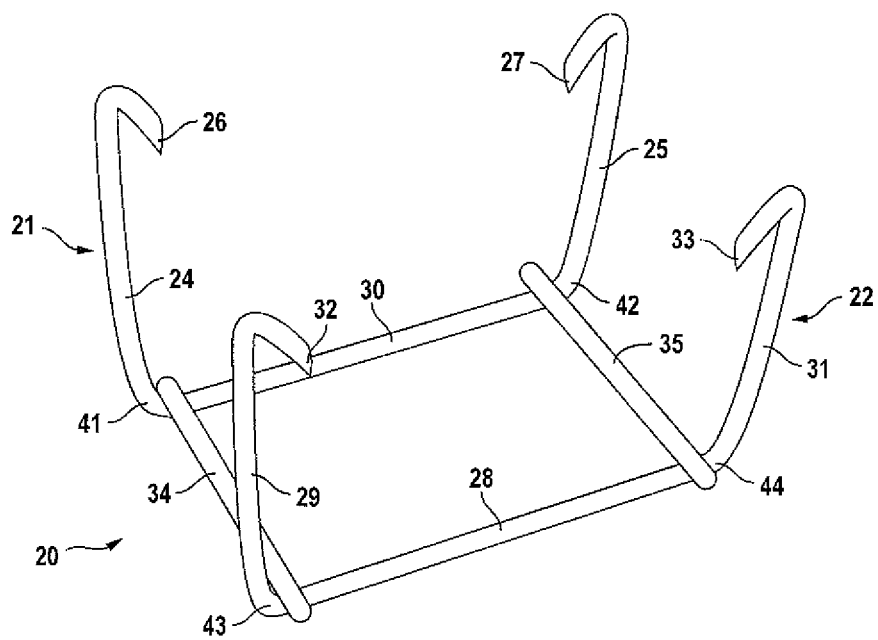
FIG. 2 is a perspective view of a second embodiment of the present invention

As an alternative, instead of the base portions of the device being oriented diagonally to one another as shown in FIG. 1, they can be oriented in parallel as shown in FIG. 2. In this regard, reference is made to FIG. 2 depicting device 20. Specifically, the device comprises two U-shaped members 21 and 22, each U-shaped member having a base portion 28 and 30, each U-shaped member also having two arm portions 24 25 and 29, 31. The arm portions are characterized as each having a proximal end 41, 42 and 43, 44 and distal ends ideally terminating in hook segments 26, 27 and 32, 33, respectively. In order to maintain the parallel orientation of these various segments, cross members 34 and 35 are shown bridging base portions 28 and 30. Ideally, this device is composed of wire whose various segments are spot welding to one another at their points of intersection although a device could be made from stamping flat stock or by injecting molding a suitable plastic resin.

In turning to FIG. 3, arm portions 24 and 25 are shown being introduced to joist or rafter 36 in the direction of arrows 37. This depicts spacing of arm portions 24 and 25 a distance "a" for capturing rafter or joist 36 at its dimension "a." If rafter or joist 36 is a structural member, such as a 2×4, dimension "a" is 1⅝". Thus, dimension "a' measured from the ends of inwardly extending hook members 26 and 27 would be slightly less than 1⅝". Thus, arms 24 and 25 would slightly bow outwardly as the wire constituting the present device would be somewhat flexible so that the ends of inwardly turning hook members 26 and 27 would frictionally capture the sides of rafter or joist 36 thus frictionally retaining the device thereto. Obviously, the device can be inserted using a single hand which is ideal and the device can be removed when necessary, by simply pulling upon it opposite the direction of arrows 37.

In turning to FIG. 4, the device of FIG. 1 is shown capturing rafter or joist 40 in carrying out the claimed method. In this regard, a wire or cable 50 is first laid upon the base portion of the device composed of segments 9 and 13. Once doing so, the device is aligned against a side of rafter or joist 40 and pushed against the side wall 51 until frictional contact is made ideally resulting in hook segments 11 and 12 being pressed within rafter or joist 40 as shown. Cable 50 would then remain hung from rafter or joist 40 without need for any further capturing means such as staples or tape.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like.

Therefore, the above description and illustration should not be considered as limiting the scope of the invention, which is defined by the appended claims.

What is claimed is:

1. A device for securing cable to a structural support, said device comprising two U-shaped members, each U-shaped member having a base portion and two arm portions, each arm portion having a proximal end and a distal end, each proximal end extending from said base portion, the distal ends being spaced from one another at a distance to capture said structural support and to frictionally secure said device thereto, and wherein the base portions of said U-shaped members are oriented diagonally to one another.

2. The device of claim 1 wherein said arm portions terminate in hook segments extending from the distal ends of said arm portions.

3. The device of claim 2 wherein said hook segments extend inwardly and towards one another.

4. The device of claim 3 wherein said hook segments are spaced to frictionally capture said structural support.

5. The device of claim 1 further comprising cross members bridging said base portions of said U-shaped members.

6. The device of claim 1 wherein said structural support is a rafter or joist.

7. The device of claim 6 wherein said rafter or joist has at least one dimension of approximately 1⅝" and wherein said distal ends are spaced to frictionally capture said rafter or joist of said dimension.

* * * * *